(12) United States Patent
Nakamura et al.

(10) Patent No.: US 6,288,501 B1
(45) Date of Patent: Sep. 11, 2001

(54) BALLAST FOR A DISCHARGE LAMP

(75) Inventors: Toshiaki Nakamura, Kadoma; Hirofumi Konishi, Hirakata; Tsutomu Shiomi, Nara, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/577,490

(22) Filed: May 25, 2000

(30) Foreign Application Priority Data

May 26, 1999 (JP) .................................................. 11-147193

(51) Int. Cl.[7] .................................................. H05B 37/02
(52) U.S. Cl. .......................... 315/307; 315/247; 315/224
(58) Field of Search .................................... 315/307, 224, 315/247, 244, 291, 225, 308

(56) References Cited

U.S. PATENT DOCUMENTS

| | | | |
|---|---|---|---|
| 5,705,897 | * 1/1998 | Hanazaki et al. | 315/307 |
| 5,729,443 | 3/1998 | Pavlin | 363/21 |
| 5,910,712 | * 6/1999 | Toyama | 315/224 |
| 6,002,215 | * 12/1999 | Yamashita et al. | 315/308 |
| 6,008,594 | * 12/1999 | Kita et al. | 315/247 |
| 6,011,361 | 1/2000 | Blankers | 315/307 |
| 6,069,458 | * 5/2000 | Takehara et al. | 315/307 |

FOREIGN PATENT DOCUMENTS 10-511220    10/1998  (JP) .

* cited by examiner

Primary Examiner—Don Wong
Assistant Examiner—Wilson Lee
(74) Attorney, Agent, or Firm—Arent, Fox, Kintner, Plotkin & Kahn, PLLC

(57) ABSTRACT

A ballast includes a voltage converter providing a DC power from a DC source voltage. The converter includes a switching element and an energy storing element having an inductance. The switching element is controlled to operate for repetitively switching the DC source voltage in order to store energy into the energy storing element. A power converter is included in the ballast to receive the energy and convert it into an operating power for driving the discharge lamp. A controller provides a command value and turns on and off the switching element for variable periods, respectively in accordance with the command value for generating a necessary power to the lamp. The controller gives a variable OFF-period and a variable ON-period to the switching element. The controller gives a minimum OFF-end limit and a forced maximum OFF-end limit for terminating the OFF-period, and also gives a minimum ON-end limit and a forced maximum ON-end limit for terminating the variable ON-period. The minimum OFF-end limit is defined at a timing when a secondary current flowing from the inductance decreases to zero, while the minimum ON-end limit is defined at a timing when a primary current flowing through the switching element reaches the command value. The controller terminates the OFF-period at the minimum OFF-end limit or at the forced maximum OFF-end limit, whichever comes earlier, and terminates the ON-period at the minimum ON-end limit or at said forced maximum ON-end limit, whichever comes earlier.

13 Claims, 11 Drawing Sheets

BALLAST FOR A DISCHARGE LAMP

BACKGROUND OF THE INVENTION

1. Field of the Invention

The present invention relates to a ballast for a discharge lamp, and more particularly, an electronic ballast provided with a voltage converter which provides a DC power from a DC source voltage for operating the discharge lamp.

2. Description of the Prior Art

Japanese Patent No. 10-511220 discloses a ballast for a discharge lamp which includes a voltage converter providing a DC power from a DC source voltage for operating the discharge lamp, and a controller for controlling DC power in a feedback manner based upon an output condition of the voltage converter. The voltage converter includes an inductance and a switching element which is controlled by the controller to turn on and off in order to accumulate an energy in the inductance and allow the energy to release from the inductance for applying the resulting power to operate the discharge lamp. The controller is basically configured to give a varying OFF-period of the switching element for effecting a mode in which the switching transistor is turned on upon seeing a zero-current flowing through the inductance, thereby enhancing switching efficiency. The controller is also configured to give a forced OFF-end limit for the varying OFF-period so as to turn on the switching element forcibly after an elapse of a predetermined period even if the current from the inductance does not reduce to zero, whereby avoiding a condition where the OFF-period becomes too long due to a prolonged time by which the current from the inductance reduces to zero, for prevention of a switching frequency of the switching element becoming too low. Further, the controller is configured to turn off the switching element to terminate the ON-period only after the current being fed to the inductance increases to a predetermined high level. However, this may pose a problem that the switching element should fail to turn off when the current to the inductance does not increase to the predetermined high level, as seen in a case where the DC source voltage gives a high impedance. Further, if the switching element is turned off after a long period, i.e., the ON-period becomes considerably long, the switching frequency would goes too low into an audible range, which is not acceptable for the ballast.

SUMMARY OF THE INVENTION

In view of the above problems, the present invention has been achieved to provide an improved ballast for a discharge lamp. The ballast in accordance with the present invention comprises a voltage converter providing a DC power from a DC source voltage. The voltage converter includes a switching element and an energy storing element having an inductance. The switching element is controlled to operate for repetitively switching the DC source voltage in order to store an energy into the energy storing element. A power converter is included in the ballast to receive the energy and convert it into an operating power for driving the discharge lamp. Also included in the ballast is a controller which provides a command value and turns on and off the switching element for varying time periods in accordance with the command value in order to regulate the output of the voltage converter for generating a necessary power to the discharge lamp. The controller gives a variable OFF-period in which the switching element is turned off and a variable ON-period in which the switching element is turned on. The controller gives a minimum OFF-end limit and a forced maximum OFF-end limit for terminating the OFF-period, and also gives a minimum ON-end limit and a forced maximum ON-end limit for terminating the variable ON-period. The minimum OFF-end limit is defined at a timing when a secondary current flowing from the inductance decreases to zero, while the minimum ON-end limit is defined at a timing when a primary current flowing through the switching element or a primary voltage developed across the switching element reaches a level corresponding to the command value. The controller acts to terminate the OFF-period at the minimum OFF-end limit or at the forced maximum OFF-end limit, whichever comes earlier, and to terminate the ON-period at the minimum ON-end limit or at the forced maximum ON-end limit, whichever comes earlier. By provision of the forced maximum OFF-end limit as well as the forced maximum ON-end limit respectively for the variable OFF-period and ON-period, the switching element can operate at an admissible switching frequency, while flowing a suitable current through the switching element without causing a substantial lowering of switching efficiency, which is therefore a primary object of the present invention.

Preferably, the controller gives the maximum OFF-end limit which varies in accordance with the output condition of the voltage converter so that the OFF-period can terminate at an optimum timing for keeping the suitable switching frequency even in the absence of the secondary current decreasing to zero. For this purpose, the controller monitors an output power of the voltage converter as indicative of the output condition and provides the command value based upon the output power. The controller causes the forced maximum OFF-end limit to vary in accordance with the command value in a direction of shortening the OFF-period as the command value demands to flow an increased current through the switching element. Thus, it is possible to increase the output power without accompanying the lowering the switching frequency. This is particularly suitable for rapidly increasing lamp luminosity at a so-called cold start condition where the lamp voltage is low.

The controller may include a voltage detector which detects the primary voltage across the switching element and compares the primary voltage with a reference so as to judge that the secondary current decreases to zero when the primary voltage decreases to the reference. Alternatively, the controller may include a voltage variation detector which detects a variation in the voltage across the switching element and compares the variation with a reference so as to judge that the secondary current decreases to zero when the variation reaches the reference.

Preferably, the controller may include a comparator which compares an output voltage of the voltage converter with an allowable maximum voltage and issues a limit signal when the output voltage exceeds the allowable maximum voltage. In response to the limit signal, the controller operates to prolong the subsequent OFF-period until the output voltage goes below the allowable maximum voltage, thereby preventing the voltage converter from providing an excess output voltage at the time of starting the lamp.

It is also preferred that the controller gives the forced maximum ON-end limit which varies in accordance with the DC source voltage so that the ON-period terminates earlier as the DC source voltage becomes higher. Whereby, the ON-period can be suitably adjusted in a condition where the DC source voltage varies to a large extent.

Further, the controller may be configured to give the command value having an upper limit which defines a maximum current allowed to flow through the switching element. Thus, it is possible to avoid an excess current flowing through the switching element.

The controller may include a delay circuit which delays an increase of the command value when the voltage converter starts operating, thereby enabling a soft-starting of the ballast for reducing stresses applied to the switching element and other components of the voltage converter.

Further, the controller may include a restrictor which reduces the upper limit of the command value to a low level for a predetermined starting period from the start of operating the ballast and restores the upper limit to a high level thereafter, thereby reducing stresses applied to the switching element and other components of the voltage converter at the start of operating the ballast.

Also, the controller may include an output voltage monitor which monitors an output voltage of the voltage converter so as to reduce the upper limit to a lower level as the output voltage becomes greater. Thus, it is possible to limit the ON-period at the start of operating the ballast, i.e., at a no-load condition, for restricting the switching current to a moderate level, thereby reducing stress applied to the switching element as well as other components of the voltage converter.

Still further, the controller may include an output voltage monitor which monitors an output voltage of the voltage converter and provides a promote signal when the output voltage exceeds a maximum voltage which is greater than an operating voltage for operating the lamp. In response to the promote signal, the controller varies the minimum ON-end limit of the ON-period in a direction of elongating the ON-period than in the absence of the promote signal. Thus, the controller enables give an elongated ON-period so as to supply a sufficient output current to the lamp at a nearly no-load condition, i.e., immediately after the start of the lamp for successfully operating the lamp.

These and still other objects and advantages will become more apparent from the following description of the embodiments when taken in conjunction with the attached drawings.

DETAILED DESCRIPTION OF THE EMBODIMENTS

This application is based on application No. 11-147193 filed in Japan, the content of which is incorporated hereinto by reference.

Figure 1:
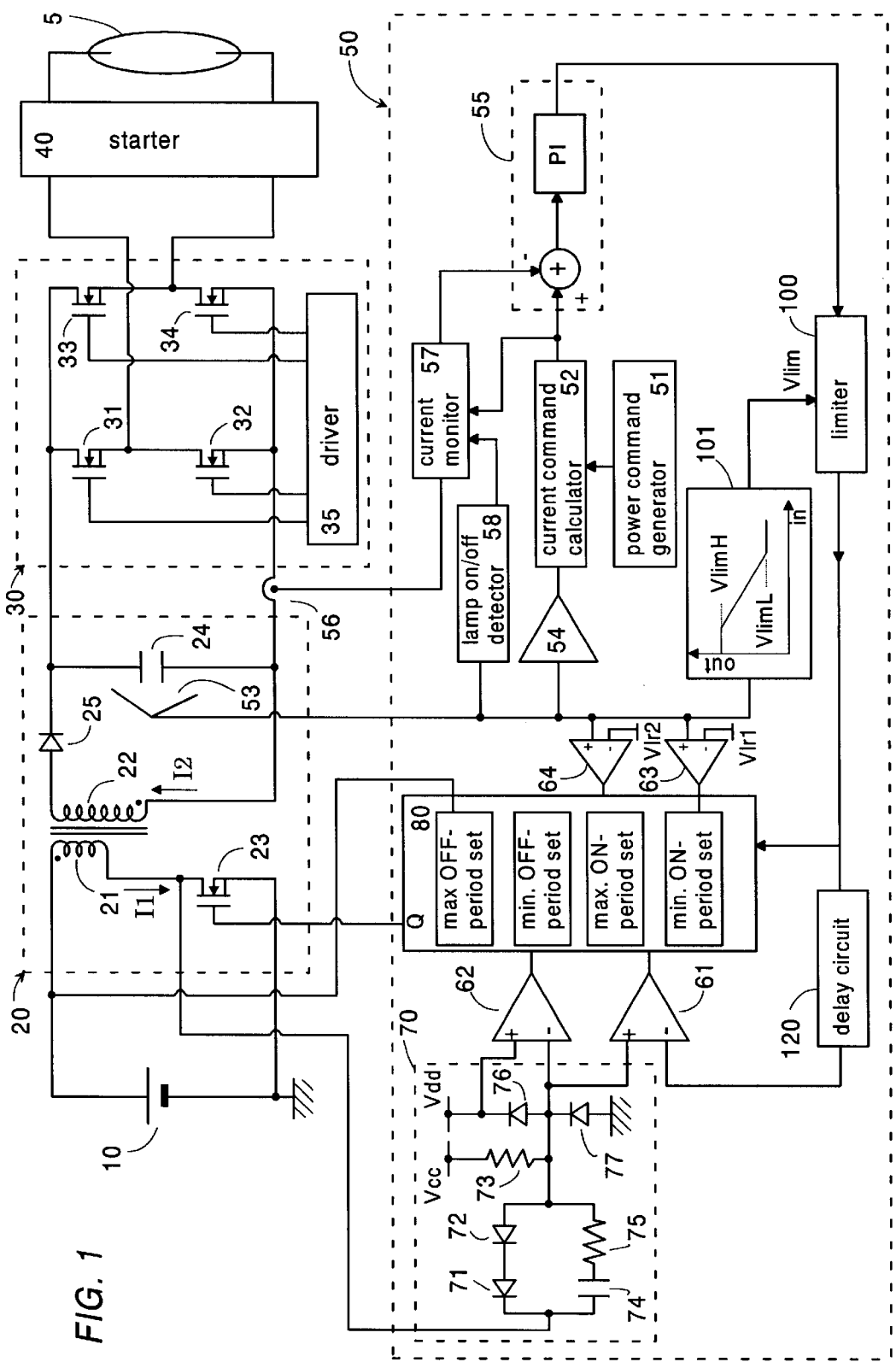
FIG. 1 is a schematic circuit diagram of a ballast for a discharge lamp in accordance with a first embodiment of the present invention.

Referring now to FIG. 1, there is shown a ballast for a discharge lamp in accordance with a first embodiment of the present invention. The ballast comprises a voltage converter 20 providing a smoothed DC voltage from a DC source voltage supplied from a battery 10, an inverter 30 receiving the DC voltage and providing an AC voltage which is applied through a starter 40 to operate the discharge lamp 5, for example, a high intensity discharge lamp utilized as a headlamp of an automobile.

The converter 20 is configured as a fly-back converter comprising a transformer with a primary winding 21 and a secondary winding 22, and a switching element or transistor 23 connected in series with the primary winding across the battery 10. The transistor 23 is driven by a controller 50 to turn on and off for repetitively interrupt a primary current I1 flowing through the primary winding 21 from the battery 10, thereby accumulate a resulting induced voltage in the secondary winding 22. A smoothing capacitor 24 is connected in series with a diode 25 across the secondary winding 22 to provide a smoothed DC voltage to the inverter 30. The winding sense of the windings 21 and 22 is indicated in FIG. 1 by mean of polarity dots such that the diode 25 conducts to flow a secondary current I2 from the secondary winding 22 into the smoothing capacitor 24 during the OFF-period of the transistor 23, thereby charging the capacitor 24.

The inverter 30 is of a full-bridge configuration having four switches 31, 32, 33 and 34 which are driven by a driver 35 to turn on and off in such a manner that one diagonally opposed pair of switches 31 and 34 are turn on and off alternately with the other diagonally opposed pair of switches 32 and 33 to provide an AC voltage to the lamp 5.

The starter 40 receives the AC voltage from the inverter 30 and operates to generate high voltage pulses to start the lamp 5 and stop generating the pulses after the lamp is started.

The controller 50 is responsible for controlling the voltage converter 20 to regulate the power being applied to the lamp 5 in a feedback manner. The controller 50 includes a power command generator 51 which determines an output power of the converter 20 for the lamp and issues a power command indicative of the output power. A current command calculator 52 is connected to receive the power command as well as the output voltage of the capacitor 24 being monitored by an output voltage monitor 53 and amplified through an amplifier 54 for generating a current command which is a target current value for an output current of the converter 20. The current command is fed to one end of an error amplifier 55 which receives at the other end the output current of the converter 20 being monitored at an current sensor 56 and fed through a current monitor 57. Based upon the current command and the output current, the error amplifier 55 provides a command value, i.e., a peak current command value for the primary current of the converter 20. The peak current command value is fed to an inverted input (−) of a first comparator 61 through a limiter 100 and a delay circuit 120 of which functions will be discussed later.

The controller 50 includes a switch voltage detector 70 which is connected to detect a voltage being developed across the transistor 24 of the converter 20, i.e., a drain-source voltage of transistor 24 which is indicative of the primary current I1 through transistor 24. The drain-source voltage can be also indicative of a timing when the secondary current I2 through the secondary winding 22 reduces to zero for the reason as explained below. When transistor 24 is turn off to flow the secondary current I2 through the secondary winding 22, the primary winding 21 sees a counter electromotive force which is additive to the source DC voltage of the battery 10 so that the drain-source voltage becomes considerably higher than the source DC voltage. Thereafter, when the secondary winding 22 release its energy to such an extent that the secondary current I2 decreases to zero, the drain-source voltage rapidly becomes nearly equal to the source DC voltage of the battery 10. Therefore, the secondary current I2 is determined to become zero when a variation $\Delta V$ in the drain-source voltage to a certain level (which is given by a reference voltage Vdd). The drain-source voltage is processed at the switch voltage detector 70 to be indicative of the primary current as well as the timing of the secondary current decreasing to zero and is supplied to a non-inverting input (+) of the first comparator 61 as well as an inverting input (−) of a second comparator 62. Thus, the first comparator 61 provides a high level output to an oscillator 80 when the drain-source voltage indicative of the primary current I1 reaches the command value indicative of the peak current command from the error amplifier 55. The high level output from the first comparator 61 is utilized in the oscillator 80 to turn off the transistor 23 at a particular timing as will be discussed in later. The second comparator 62 receives at its non-inverting input (+) a reference voltage Vdd with which the variation $\Delta V$ in the drain-source voltage is compared so that the second comparator 62 provides a high level output when the variation $\Delta V$ is lowered to the reference voltage Vdd as indicative of that the secondary current I2 decreases to zero.

In order to monitor the primary current I1, the switch voltage detector 70 includes a series connected pair of diodes 71 and 72 which are connected between a voltage source Vcc and the drain of transistor 23 through a pull-up resister 73. A connection between the pull-up resistor 73 and the diode 72 is connected to the non-inverting input (+) of the first comparator 61 for giving the voltage indicative of the primary current. Clamping diodes 76 and 77 are included in the voltage detector 70 so as to clamp an excessive voltage and a lowest voltage respectively for the drain-source voltage being monitored at the detector 70. In order to monitor the variation $\Delta V$ in the drain-source voltage, the detector 70 includes a differentiator composed of a capacitor 74 and a resistor 75.

Figure 2:
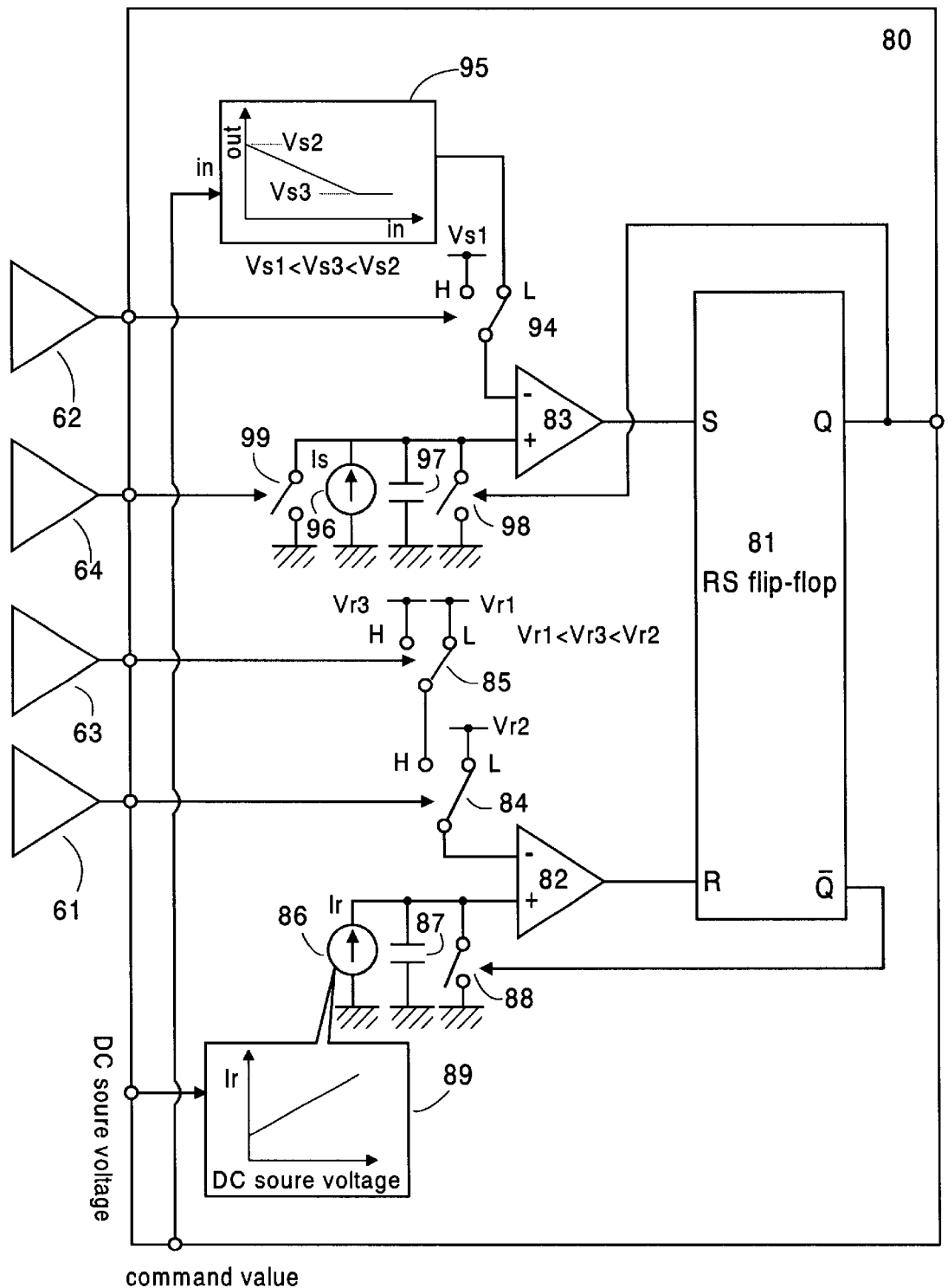
FIG. 2 is a schematic circuit diagram of an oscillator utilized in the ballast.

The oscillator 80 has functions of determining maximum ON-period and minimum ON-period of transistor 23 as well as maximum OFF-period and minimum OFF-period of transistor 23. The high level output from the first comparator 61 is utilized to determine the minimum ON-period of transistor 23, while the high level output from the second comparator 62 is utilized to determine the minimum OFF-period of transistor 23. As shown in FIG. 2, the oscillator 80 includes an RS flip-flop 81 of which Q output is connected to the gate of transistor 23 for turning on and off the same, a reset comparator 82 having its output connected to a reset input (R) of the flip-flop 81, and a set comparator 83 having its output connected to a set input (S) of the flip-flop 81.

Figure 3:
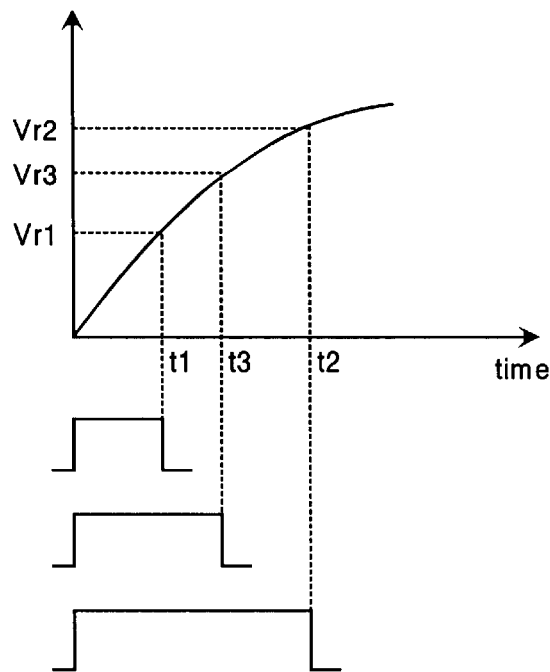
FIGS. 3 and 4 are charts showing the operations of the oscillator.

Included in the oscillator 80 are a first switch 84 and a second switch 85 which provide reference voltages Vr1, Vr2, and Vr3 selectively applied to an inverting input (−) of the reset comparator 82. These reference voltages are set to have a relation that Vr1<Vr3<Vr2. Connected to an non-inverting input (+) of reset comparator 82 is a timer composed of a current source 86, and a parallel combination of a capacitor 87 and a switch 88 connected across the current source 86. The switch 88 is connected to Q(−) output of RS flip-flop 81 to open in response to the flip-flop 81 causing the transistor 23 to turn on, whereby the capacitor 87 starts being charged by a current If from the current source 86 so as to provide an increasing voltage to the non-inverting input (+) of the reset comparator 82, as shown in FIG. 3. When the inverting input (−) of the reset comparator 82 is connected to the reference voltage Vr1, the reset comparator 82 provides, at a timing t1 when the voltage across capacitor 87 reaches Vr1, a high level output to a reset input (R) of the flip-flop 81, turning off transistor 23, i.e. terminating the ON-period of the transistor. Likewise, when the inverting input (−) of reset comparator 82 is connected to Vr3 and Vr2, the ON-period of transistor 23 terminates at timing t2 and t3, respectively.

The first switch 84 is actuated by the first comparator 61 to apply the largest reference voltage Vr2 to the inverting input (−) of reset comparator 82 in response to the low level output from the first comparator 61, i.e., the primary current I1 not reaching the command value or the peak current command value from the error amplifier 55. When the first comparator 61 gives the high level output in response to the primary current I1 reaching the peak current command value, the first switch 84 is turned over to apply either of the lowest reference voltage Vr1 or the medium reference voltage Vr3 by way of the second switch 85 to the inverting input (−) of the reset comparator 82. Normally, the second switch 85 is set to connect the lowest reference voltage Vr1. Therefore, transistor 23 is turned off at the earliest timing t1 when the primary current has reached to the peak current command value or the target current value. Otherwise, transistor 23 is turned off at latest timing t2. In this sense, ON-period of transistor 23 has a minimum ON-end limit defined by the timing t1 and a maximum ON-end limit defined by the timing t2. With the provision of the maximum ON-end limit to the ON-period, it is possible to avoid the transistor 23 from being kept turned on over an excess time period. This is particularly advantageous in a condition where the DC source voltage involves such a high impedance that the primary current may saturate before reaching the peak current command value, acting to keep the transistor 23 turned on continuously. The minimum ON-end limit is selected in order to avoid an undesired occurrence where transistor would turn off immediately after unstable ON-condition.

The second switch 85 is actuated by a voltage comparator 63 which, as shown in FIG. 1, compares the output voltage of the converter 20 with a reference voltage Vlr1 to provide a high level output when the output voltage reaches Vlr1. The reference voltage Vlr1 is set such that the comparator 63 provides the high level output when the output voltage of the converter 20 increases to a level indicative of a no-load condition where the lamp is not started. In response to the no-load condition, the comparator 63 actuates the second switch 85 so as to apply the medium reference voltage Vr3 to the inverting input (−) of the reset comparator 82. Thus, the flip-flop 81 causes the transistor 23 to turn off at the timing t3, i.e., the ON-period is made longer than otherwise, thereby enabling to flow the primary current sufficiently current for stably operating the lamp.

Further, the oscillator 80 includes a function unit 89 which receives an input voltage supplied to the converter 20 and provides an output which increases the current Ir supplied from the current source 86 as the input voltage increases. Thus, as the input voltage, i.e., the DC source voltage increases, the capacitor 87 is charged at an increased rate to thereby shorten the ON-end limits, respectively defined by the timings t1, t2, and t3 at which the capacitor 87 is charged up to the reference voltages Vr1, Vr2, and Vr3. In other words, the ON-period of transistor 23, particularly the maximum ON-period is shortened as the input voltage increases, and is elongated as the input voltage decreases, allowing to flow the primary current suitably in accordance with the input voltage.

In short, the transistor 23 is turn off when the primary current reaches the peak current command value or when the maximum ON-period is terminated, whichever comes earlier. And, the transistor 23 is given a minimum ON-period which terminates at the timing t1. Immediately after the transistor 23 is turned off, the switch 88 is closed by the flip-flop 81 to discharge the capacitor 87 so that the capacitor 87 is ready for a subsequent timer operation of determining the timing of turning off transistor 23.

Figure 4:
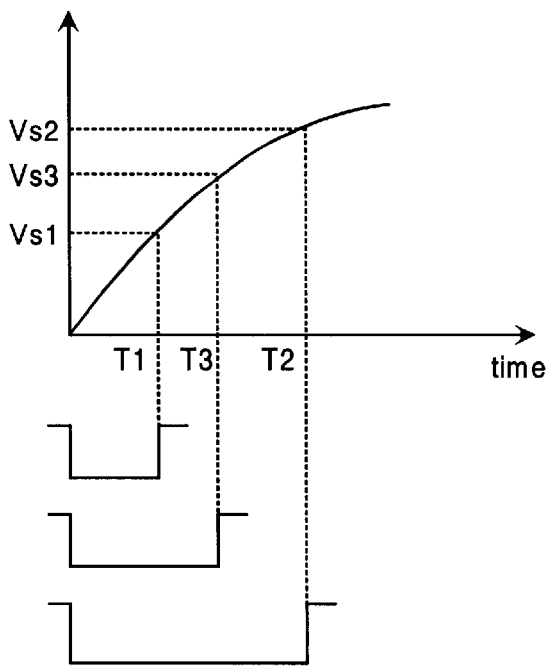

Next, an explanation is made to a scheme of determining an OFF-end limit, i.e., the timing of turning on the transistor 23 after the transistor 23 is turned off. For this purpose, the oscillator 80 includes a switch 94 which applies reference voltages Vs1 and a variable reference voltage between Vs2 and Vs3, selectively to the inverting input (−) of the set comparator 83. The reference voltages Vs1, Vs2, and Vs3 are set to have a relation Vs1<Vs3<Vs2. Connected to an non-inverting input (+) of the set comparator 83 is a timer composed of a current source 96, and a parallel combination of a capacitor 97 and a switch 98 connected across the current source 96. The switch 98 is connected to Q output of RS flip-flop 81 to open in response to the flip-flop 81 causing the transistor 23 to turn off, whereby the capacitor 97 starts being charged by a current Is from the current source 96 so as to provide an increasing voltage to the non-inverting input (+) of the set comparator 83, as shown in FIG. 4. When the inverting input (−) of the set comparator 83 is connected to the reference voltage Vs1, the set comparator 83 provides, at a timing T1 when the voltage across capacitor 97 reaches Vs1, a high level output to a set input (S) of the flip-flop 81, turning on transistor 23, i.e. terminating the OFF-period of the transistor. Likewise, when the inverting input (−) of set comparator 83 is connected to a voltage between Vr3 and Vr2, the OFF-period of transistor 23 terminates at timing between T2 and T3.

The switch 94 is actuated by the second comparator 62 to apply the lowest reference voltage Vs1 to the inverting input (−) of set comparator 83 in response to the high level output from the second comparator 62, i.e., the secondary current decreases to zero. When the second comparator 83 gives the low level output in response to the secondary current I2 not yet decreasing to zero, the switch 94 is turned over to apply a varying reference voltage between Vs3 and Vs2 to the inverting input (−) of the set comparator 83. Therefore, transistor 23 is turned on at the earliest timing T1 when the secondary current has decreased to zero. Otherwise, transistor 23 is turned off at a later timing between T3 and T2. In this sense, OFF-period of transistor 23 has a minimum OFF-end limit defined by the timing T1 and a maximum OFF-end limit defined by the timing T2. Thus, the transistor 23 is turned on when the secondary current decreases to zero at the timing T1 or when the maximum OFF-end limit is reached, whichever comes earlier. This eliminates a possibility that the transistor 23 is turned off after the secondary current has decreased to and is kept at zero. Otherwise, in the subsequent ON-period, the switching current having unduly high peak would have to flow through the converter 20, reducing the switching efficiency. Further, with the provision of the maximum OFF-end limit in addition to the maximum ON-end limit, it is possible to keep the switching frequency within an acceptable range.

The variable reference voltage between Vs3 and Vs2 is generated at a function unit 95 to be lowered from Vs2 to Vs3 as the command value or the target peak current command value increases. The variable reference voltage is utilized to determine the OFF-end limit, i.e., terminate the OFF-period when the secondary current has not decreased to zero. This is called as a continuous mode where the transistor 23 is turned on while the secondary current still flows, as compared to a border mode where the transistor 23 is turned on substantially at the timing when the secondary current decreases to zero. The continuous mode appears when the primary current is caused to flow in an increased amount in the preceding ON-period in order to supply an increased power for rapidly increasing lamp luminosity at a so-called cold starting of the lamp. With the increase of the primary current, an increased time period is required before the secondary current decreases to zero. Therefore, in the absence of the continuous mode, i.e., if only the border mode is available, the switching frequency would be lowered. However, with the provision of the forced OFF-end limit to realize the continuous mode at the particular condition, the OFF-period of transistor 23 is limited so as not to lower the switching frequency. The reference voltage Vs3 is set to a moderate level which allows the secondary current to flow to a sufficient level not to cause lowering of the switching efficiency. The minimum OFF-end limit defined by the timing T1 is set to allow the OFF-period to continue free from unstable switching phenomenon due to ringing appeared immediately following the turning off of the transistor 23.

In short, the transistor 23 is turn on when the secondary current decreases to zero or when the maximum OFF-period defined by the timing T2 is terminated, whichever comes earlier. Immediately after the transistor 23 is turned on, the switch 98 is closed by the flip-flop 81 to discharge the capacitor 97 so that the capacitor 97 is ready for a subsequent timer operation of determining the timing of turning on transistor 23.

Further, in order to avoid the output voltage of the converter 20 from going too high, the oscillator 80 includes a disable switch 99 which is connected across the current source 96 to disable the charging of capacitor 96 when the output voltage being monitored exceeds a predetermined maximum level. The switch 99 is actuated by a voltage comparator 64 which, as shown in FIG. 1, compares the output voltage of the converter 20 with a reference voltage Vlr2 corresponding to the maximum level, so as to provide a high level output when the output voltage reaches Vlr2. When the output voltage increases to the maximum level Vlr2, which occurs during the ON-period of the transistor 23, the comparator 64 actuates to close the switch 99, thereby disabling the timer operation of determining the OFF-end limit in the subsequent OFF-period of transistor 23 until the output voltage becomes lower than the maximum level.

With reference to FIG. 1, a detailed explanation is now made to the limiter 100 providing for limiting the peak current command value provided from the error amplifier 55. The limiter 100 receives a limit value in the form of a voltage generated at a limit value generator 101, in addition to the peak current command value also in the form of a voltage so as to pass the lower one of the two voltages as a fresh peak current command value to the comparator 61 in order to prevent the primary current from flowing excessively through transistor 23. The limit value generator 101 is a function unit which receives the output voltage of the converter 20 and gives the limit value Vlim which decreases as the output voltage increases within a limited range between VlimH and VlimL. Thus, when the output voltage of the converter 20 is relatively low as indicative of that the lamp is just started, the limit value is raised, enabling to flow the primary current sufficiently for rapidly attaining the intended lamp luminosity. During the stable lamp operation condition where the output voltage of the converter 20 is relatively high to flow the primary current in a small amount, the limit value Vlim is lowered so that the primary current is kept stable free from increasing abruptly. The lowest limit value VlimL is set to avoid undesired stress being applied to the transistor, while the highest limit value VlimH is set to prevent the ON-period of transistor from being too short.

Figure 5:
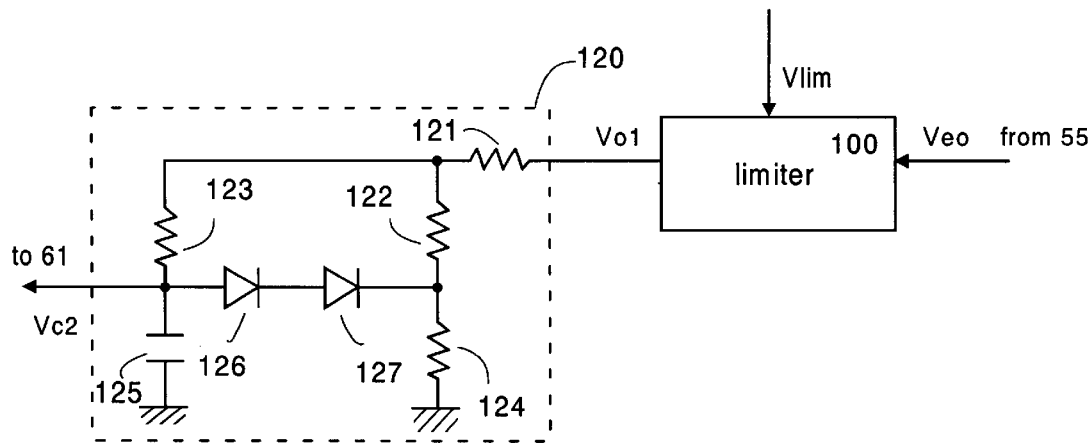
FIG. 5 is a schematic diagram showing details of a delay circuit utilized in the ballast.
Figure 6:
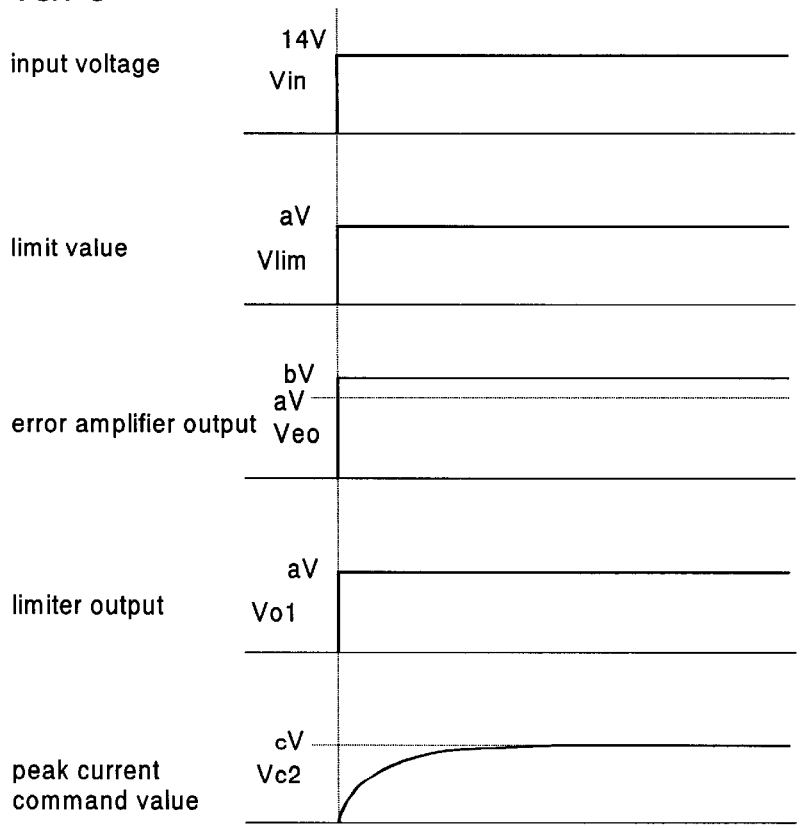
FIG. 6 is a graph showing the operation of the delay circuit.

FIG. 5 shows details of the delay circuit 120 provided between the limiter 100 and the comparator 61 for gradually increasing the peak current command value to a desired level. The circuit 120 includes a voltage divider of resistors 121, 122, 123, and 124 which divides the output voltage Vo1 of the limiter 100 indicative of the lower one of the peak current command value Veo from the error amplifier 55 and the limit value Vlim. A series connected pair of diodes 126 and 127 is connected in series with resistor 122 across resistor 123 to add the forward voltage of the diodes to the output voltage from the limiter 100, providing the resulting voltage Vc2 as a fresh peak current command value to the comparator 61. A capacitor 125 is cooperative with resistors 121 to 124 to give a time constant for delaying the rising of the peak current command value Vc2. Although not shown, capacitor 125 is connected to discharge when the ballast is deenergized. The operation of the delay circuit 120 is shown in FIG. 6. When the input voltage Vin rises, the limit value Vlim rises to aV. At the same time the output Veo of the error amplifier 55 rise to bV higher than aV, and therefore the output Vo1 of the limiter rises to aV. Then, the delay circuit 120 acts to give the peak current command value Vc2 which increases gradually to cV which is attenuated to be lower than aV. With this gradually increase of the peak current command value, it is possible to make a soft-switching of transistor 23 and therefore reduce stresses applied to transistor 23 as well as other components of the converter 20. The diodes 126 and 127 are selected to be of the same characteristic as the diodes 71 and 72 employed in the switch voltage detector 70 in order to offset a temperature-dependent or the like variation in the forward voltage of diodes 71 and 72, thereby assuring reliable comparison at the comparator 61 between the primary current being monitored and the peak current command value.

Figure 7:
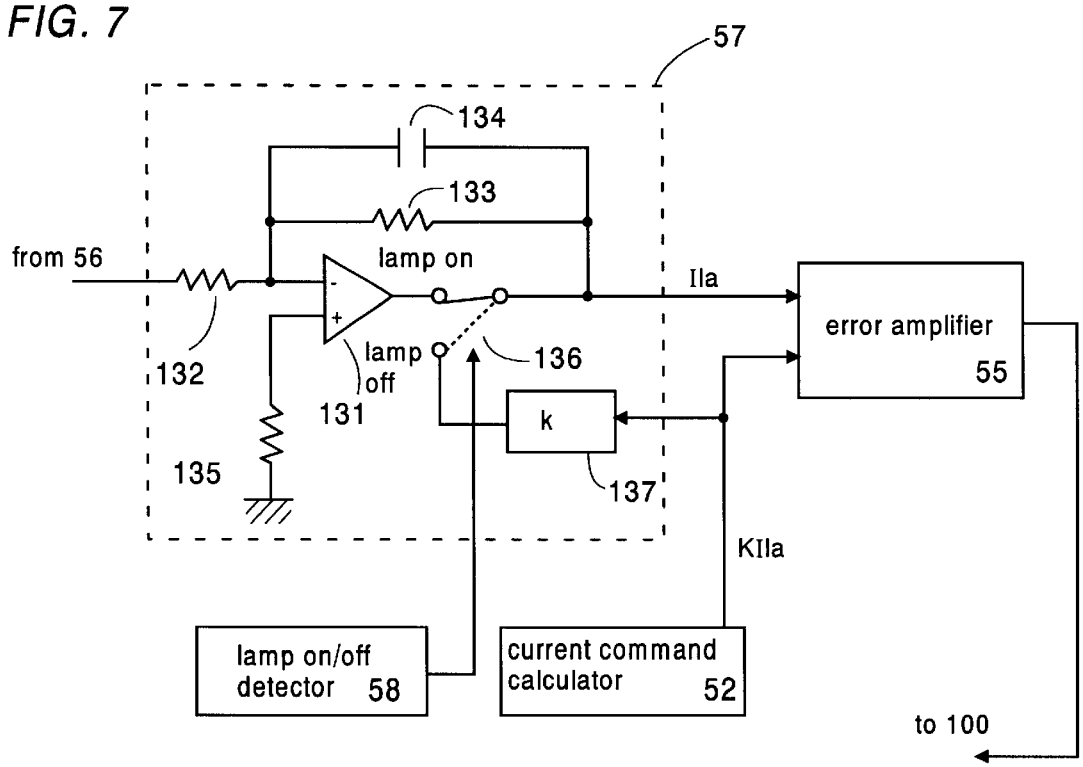
FIG. 7 is a schematic diagram of a current monitor utilized in the ballast.
Figure 8:
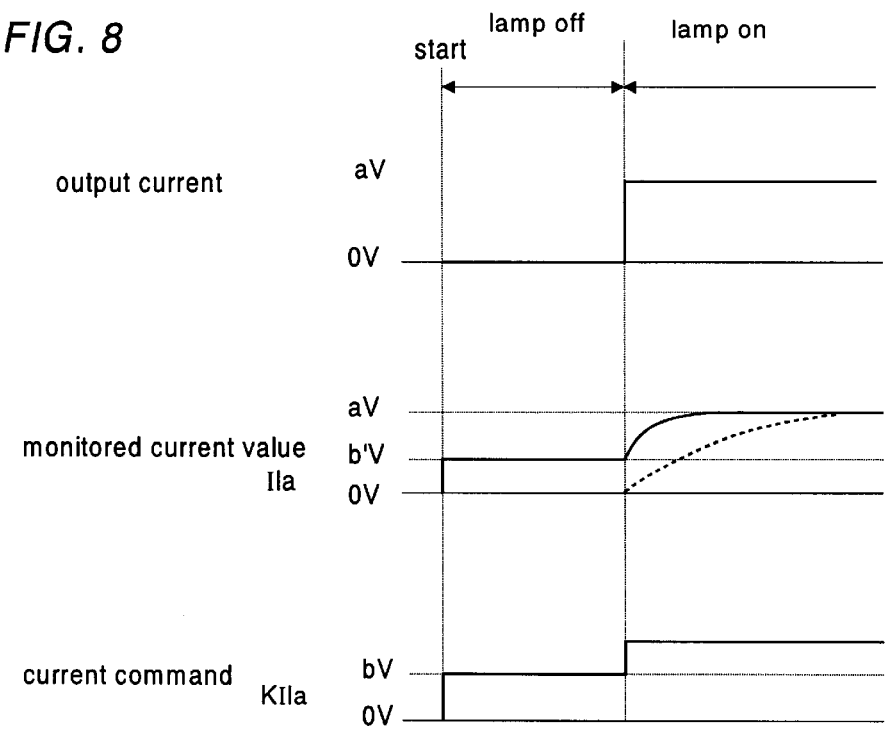
FIG. 8 is a chart showing the operations of the current monitor.

FIG. 7 shows details of the current monitor 57 which provides to the error amplifier 55 a monitored output current well indicative of the actual output current from the converter 20 during a short transition period immediately subsequent to the turn-on of the lamp 5. The current monitor 57 includes an amplifier 131 connected through a resistor 132 to the current sensor 56 for providing a corresponding amplified voltage. The amplifier 131 has its output connected through a switch 136 to the error amplifier 55 for providing the monitored current value I1a thereto. A filter is provided in association with the amplifier 131 and is composed of resistor 132, a feedback resistor 133, an offset resistor 135, and a feedback capacitor 134. The switch 136 is actuated by a lamp on/off detector 58 which, based upon the output voltage of the converter 20, detects whether the lamp is turned on or off. When the lamp is detected to turn on, the switch 136 connects the output of the amplifier 131 to the error amplifier 55. Otherwise, i.e., when the lamp is detected to be still off after the start of the lamp, the switch 136 connects the output of the current command calculator 52 to the error amplifier 55 through an attenuator 137. The attenuator 137 acts to multiply the current command KIIa by k (where 0<k<1) to provide a dummy monitored current value Ila to the error amplifier 55 through the switch 136. Operation of the current monitor 57 is explained with reference to FIG. 8. During a lamp-off period after the starting of the lamp but before the lamp is turned on, no substantial output current flows from the converter 20. During this period, the error amplifier 55 receives the dummy monitored current value Ila of b'V which is the current command KIIa multiplied by k (b'V=k×bV). Thus, immediately after the lamp is turned on, the amplifier 131 takes over to feed the monitored current value Ila which increases from b'V to aV of the actual output current by the action of the filter. Thus, the monitored output current Ila can rapidly follow the actual output current as soon as the lamp is turned on, assuring reliable lamp control. In the absence of the providing the dummy monitored output current during the lamp-off period, the monitored current value being fed to the error amplifier 55 would delay in following the actual output current, as indicated by dotted curve in FIG. 8.

Figure 9:
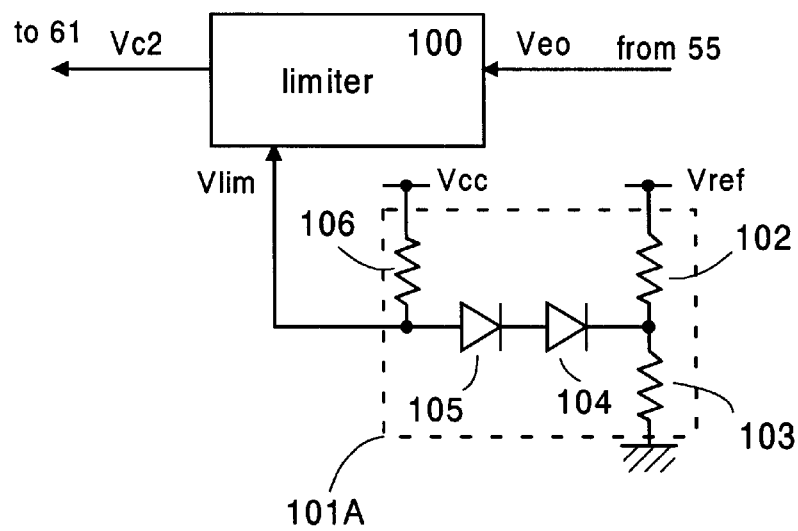
FIG. 9 is a schematic view of a modified limit value generator which may be utilized in the ballast.

FIG. 9 shows a modification of the limit value generator 101A which may be utilized instead of the above generator 101 to provide the limit value Vlim to the limiter 100. The generator 101A includes a voltage divider of resistors 102 and 103 which provides a divided voltage of a reference voltage Vref. A series connected pair of diodes 104 and 105 are connected to add the forward voltage of the diodes to the divided voltage for generating the limit value Vlim fed to the limiter 100. A pull-up resistor 106 is provided to connect the anode of diode 105 to a voltage source Vcc for conducting the diodes. The diodes 104 and 105 are selected to be of the same characteristic as the diodes 71 and 72 employed in the switch voltage detector 70 in order to offset a temperature-dependent or the like variation in the forward voltage of diodes 71 and 72, thereby assuring reliable comparison at the comparator 61 between the primary current being monitored and the peak current command value.

Figure 10:
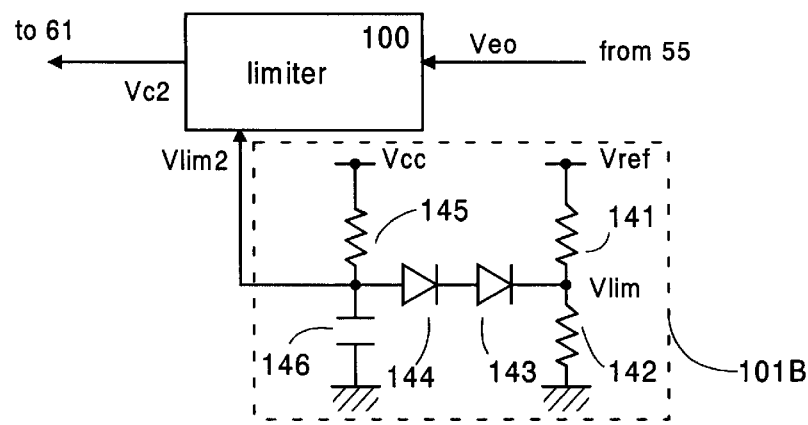
FIG. 10 is a schematic view of another modified limit value generator which may be utilized in the ballast.
Figure 11:
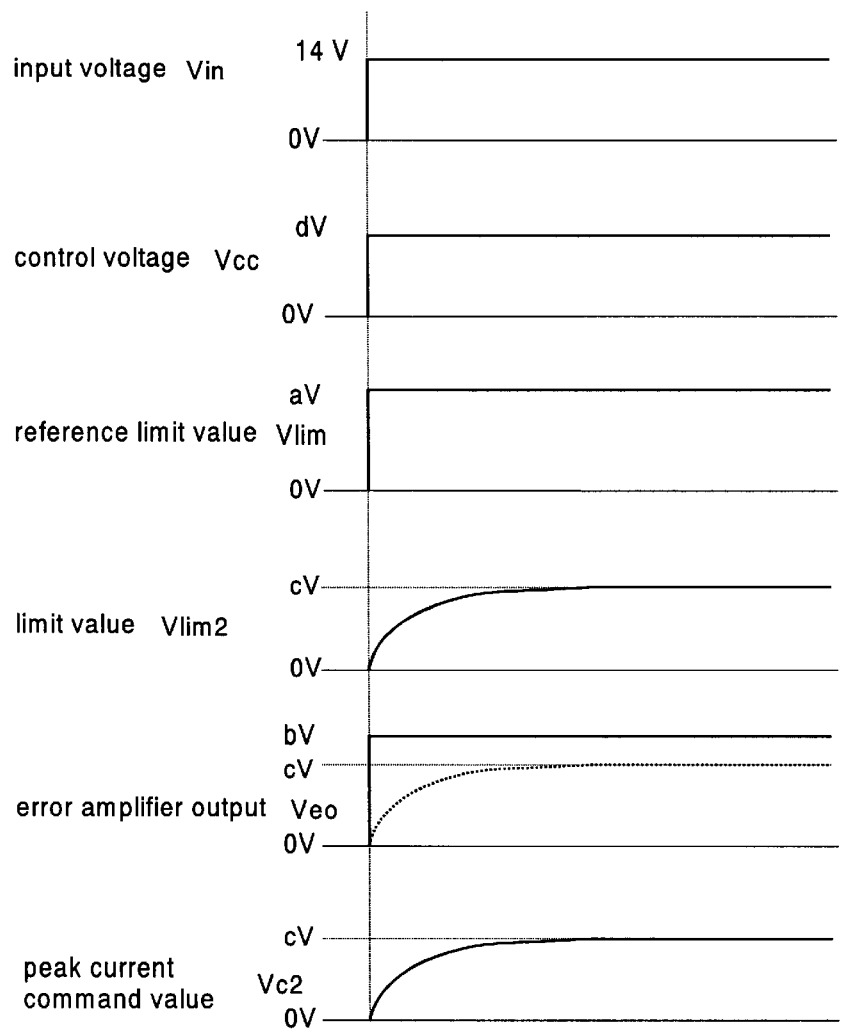
FIG. 11 is a chart showing the operations of the limit value generator of FIG. 10.

FIG. 10 shows another modification of the limit value generator 101B which may be utilized instead of the generator 101 of FIG. 1 to provide, to the limiter 100, the limit value Vlim2 which increases gradually immediately after starting of the lamp. The generator 101B includes a voltage divider of resistors 141 and 142 which provides a divided voltage of a reference voltage Vref to generate a reference limit value Vlim. A series connected pair of diodes 143 and 144 are connected to add the forward voltage of the diodes to the reference voltage Vlim. A pull-up resistor 145 is provided to connect the anode of diode 144 to a voltage source Vcc for conducting the diodes. A capacitor 146 is connected to be cooperative with resistors 141, 142, and 145 to give a time constant for delaying the rising of the reference limit value Vlim to modify it into a fresh limit value Vlim2 with gradually increasing rising edge. Although not shown, capacitor 146 is connected to discharge when the ballast is deenergized. The operation of the generator 101B is shown in FIG. 11. When the input voltage Vin rises, the control voltage Vcc as well as the reference limit value Vlim rise to dV and aV, respectively. Also, the limit value Vlim2 rises gradually to cV. When the output Veo of the error amplifier 55 is bV higher than cV, the peak current command value Vc2 will be the limit value Vlim2. With this gradually increase of the peak current command value Vc2, it is possible to make a soft-switching of transistor 23 and therefore reduce stresses applied to transistor 23 as well as other components of the converter 20. The diodes 143 and 144 are selected to be of the same characteristic as the diodes 71 and 72 employed in the switch voltage detector 70 in order to offset a temperature-dependent or the like variation in the forward voltage of diodes 71 and 72, thereby assuring reliable comparison at the comparator 61 between the primary current being monitored and the peak current command value.

Figure 12:
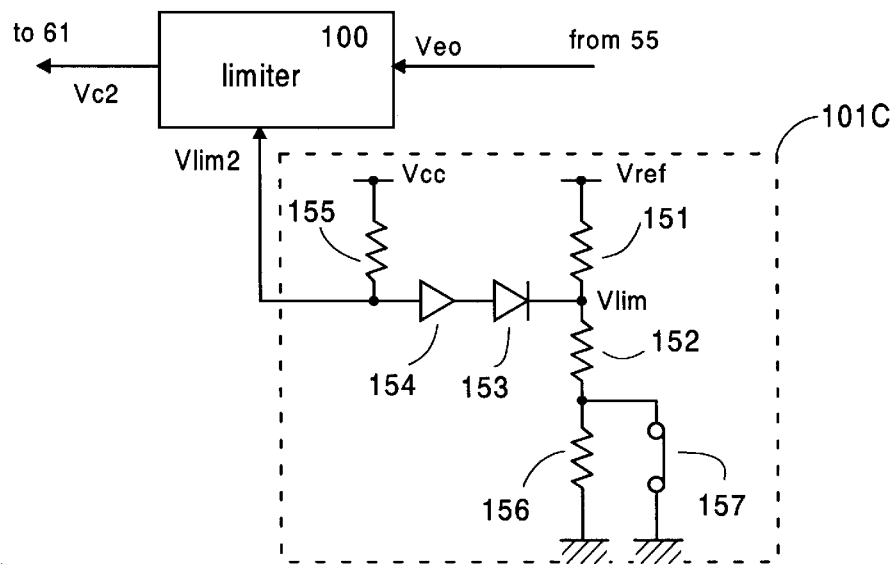
FIG. 12 is a schematic view of a further modified limit value generator which may be utilized in the ballast.
Figure 13:
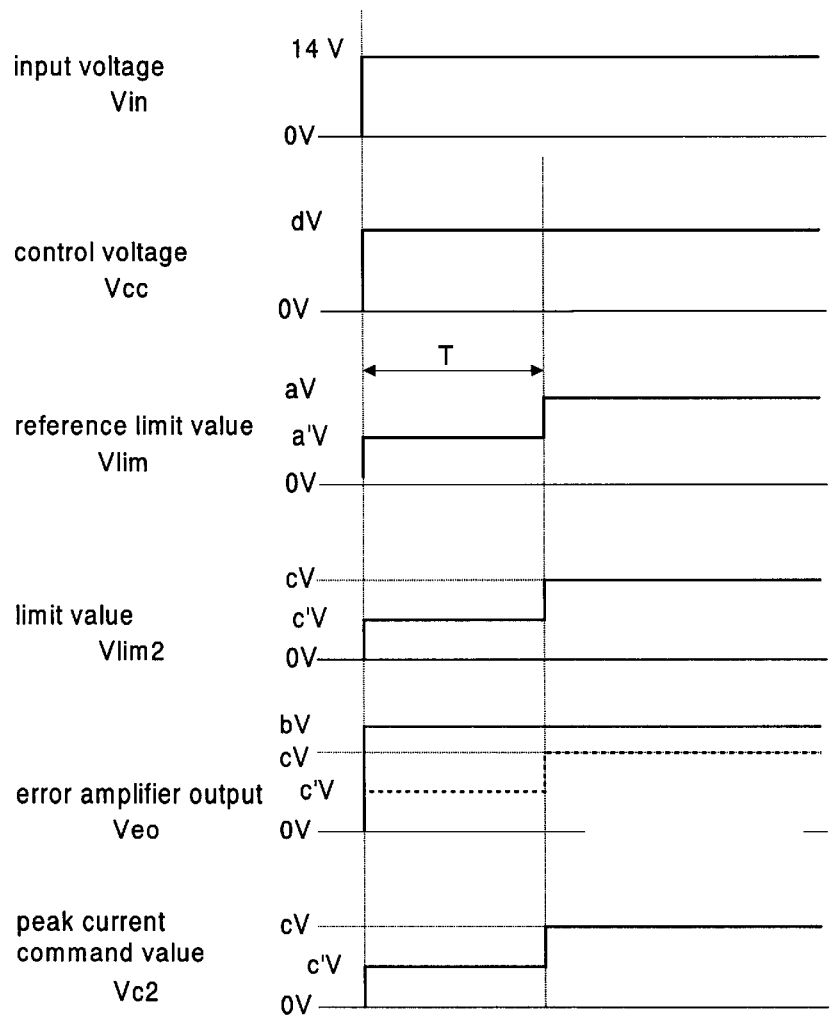
FIG. 13 is a chart showing the operations of the limit value generator of FIG. 12.

FIG. 12 shows a further modification of the limit value generator 101C which may be utilized instead of the generator 101 of FIG. 1 to provide, to the limiter 100, the limit value Vlim2 which is lowered for a limited time period T after the starting of the lamp in order to raise the peak current command value stepwise for reducing stresses applied to the transistor 23 as well as other components of the converter 20. The generator 101C includes a voltage divider of resistors 151, 152, and 156 which provides a divided voltage of a reference voltage Vref for generating a reference limit value Vlim. A series connected pair of diodes 153 and 154 are connected to add the forward voltage of the diodes to the divided voltage for generating a limit value Vlim2 to be fed to the limiter 100. A pull-up resistor 155 is provided to connect the anode of diode 154 to a voltage source Vcc for conducting the diodes. A switch 157 is connected across the resistor 156 to close for the limited time period T and open thereafter, thereby generating the lowered limit value Vlim2 as well as the reference limit value Vlim during the time period T and generating thereafter the raised limit value Vlim2 as well as the reference limit value Vlim. The operation of the generator 101C is shown in FIG. 13. When the input voltage Vin rises, the control voltage Vcc rises to dV. During the time period T immediately following the starting of the lamp, the reference limit value Vlim rises to a'V and thereafter rises stepwise to aV. Correspondingly, the limit value Vlim2 rises to c'V during the period T and thereafter rises stepwise to cV. When the output voltage Veo of the error amplifier 55 is by which is higher than cV, the limiter 100 provides the limit value Vlim2 as the peak current command value Vc2. Thus, the limit value is kept at a low level during the initial period T immediately subsequent to the starting of the lamp and is thereafter increased in a stepwise manner to a high level, enabling to make a soft-switching of transistor 23 and therefore reduce stresses applied to transistor 23 as well as other components of the converter 20. The diodes 153 and 154 are selected to be of the same characteristic as the diodes 71 and 72 employed in the switch voltage detector 70 in order to offset a temperature-dependent or the like variation in the forward voltage of diodes 71 and 72, thereby assuring reliable comparison at the comparator 61 between the primary current being monitored and the peak current command value.

Figure 14:
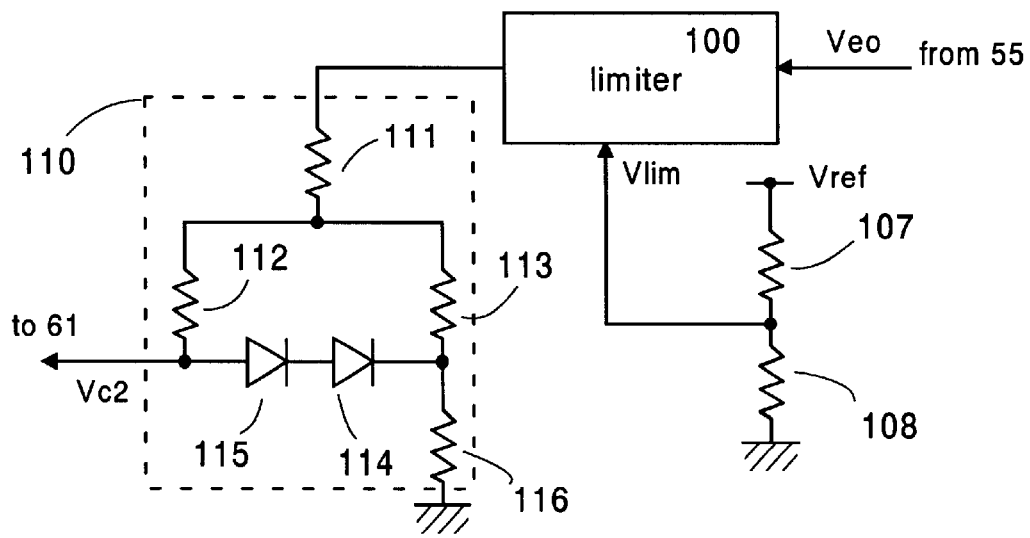
FIG. 14 is a schematic diagram showing an attenuator which may be utilized in connection with a limiter of the ballast.

FIG. 14 shows an attenuator 110 provided in connection with the limiter 100 in order to offset the temperature-dependent or the like variation in the forward voltage of diodes 71 and 72 at the switch voltage detector 70. In this instance, the limit value Vlim is a divided voltage of the reference voltage Vref by resistors 107 and 108. The attenuator 110 passes the voltage output from the limiter 100, i.e., the lower one of the limit value Vlim and the peak current command value from the error-amplifier 55, as a fresh peak current command value to the comparator 61. The attenuator 110 includes a voltage divider of resistors 111, 113, and 116 which divides the output voltage indicative of the lower one of the error amplifier output Veo and the limit value Vlim. A series connected pair of diodes 114 and 115 is connected in series with resistor 112 across resistor 113 to add the forward voltage of the diodes to a voltage appearing at a connection between resistors 113 and 116, providing the resulting peak current command value to the comparator 61. Also in the instance, the diodes 114 and 115 are selected to be of the same characteristic as the diodes 71 and 72 employed in the switch voltage detector 70 in order to offset a temperature-dependent or the like variation in the forward voltage of diodes 71 and 72, thereby assuring reliable comparison at the comparator 61 between the primary current being monitored and the peak current command value.

Figure 15:
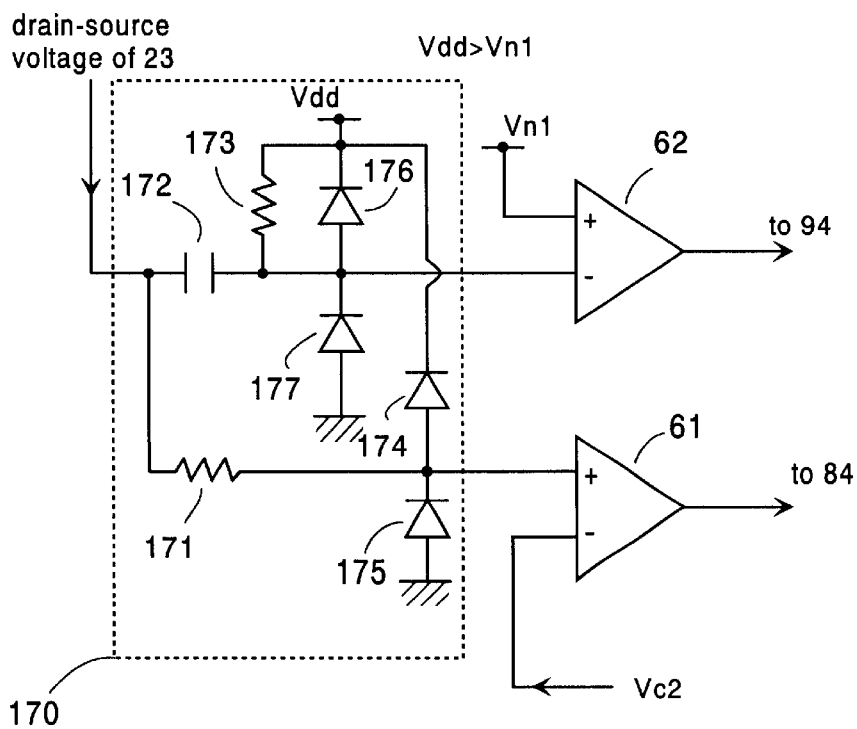
FIGS. 15 to 18 are schematic diagrams respectively showing modifications of a switch voltage detector utilized in the ballast.

FIG. 15 shows a modified switch voltage detector 170 which may be utilized instead of the detector 70 shown in the embodiment of FIG. 1. The drain-source voltage of transistor 23 is fed through a resistor 171 to the non-inverting input (+) of the first comparator 61 where it is compared with the peak current command value or command value from the error amplifier 55 for changing the ON-end limit of transistor 23. Also, the drain-source voltage of transistor 23 is fed through a differentiator composed of a capacitor 172 and a resistor 173 to the inverting input (−) of the second comparator 62 to give a variation Δ in the drain-source voltage. The variation ΔV is then compared at comparator 62 with a certain level given by a reference voltage Vn1 so as to determine the timing when the secondary current decreases to zero for the purpose of changing the OFF-end limit of transistor 23 as explained with reference to the first embodiment. A first diode clamp composed of diodes 174 and 175 is provided in circuit to prevent excessively high and low voltage from being fed to the comparator 61 for protection thereof. Likewise, a second diode clamp composed of diodes 176 and 177 is provided in circuit to prevent excessively high and low voltage from being fed to the comparator 62 for protection thereof.

Figure 16:
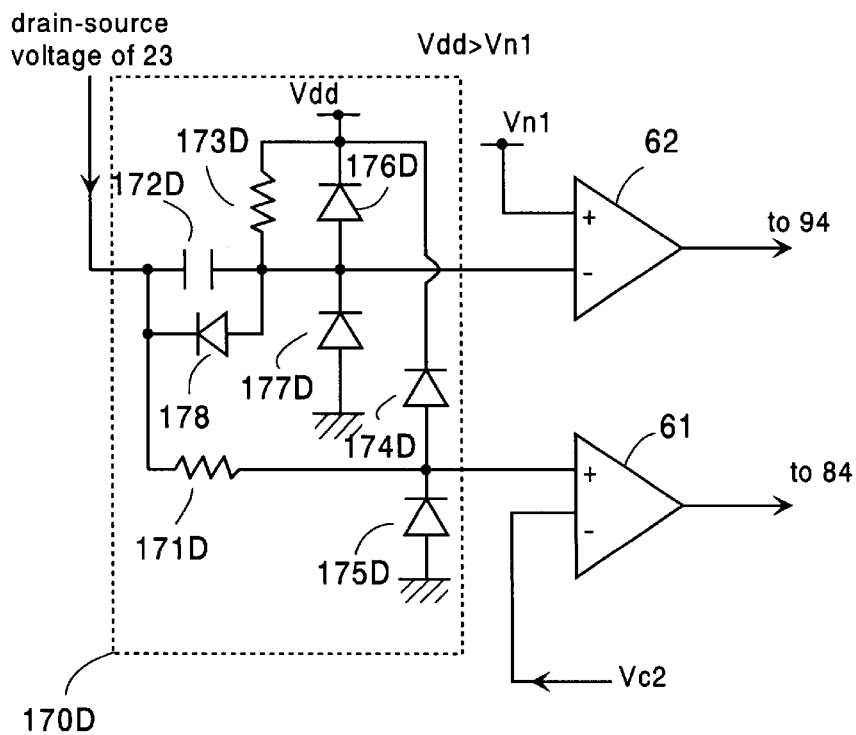

FIG. 16 shows another modified switch voltage detector 170D which may be utilized instead of the detector 70 of the embodiment of FIG. 1 and is basically identical to the modification of FIG. 15 except that a diode 178 is connected across the capacitor 172D. Like parts are designated by like reference numerals with a suffix letter of "D". With the addition of diode 178 the voltage being fed to the inverting input (−) of the second comparator 62 can includes, in addition to a component indicative of the variation ΔV, a component indicative of the drain-source voltage itself. It is found that known that the drain-source voltage itself can be also indicative of the timing when the secondary current I2 through the secondary winding 22 reduces to zero. That is, when transistor 23 is turn off to flow the secondary current I2 through the secondary winding 22, the primary winding 21 sees a counter electromotive force which is additive to the source DC voltage of the battery 10 so that the drain-source voltage becomes considerably higher than the source DC voltage. Thereafter, when the secondary winding 22 release its energy to such an extent that the secondary current I2 decreases to zero, the drain-source voltage becomes nearly equal to the source DC voltage of the battery 10. Therefore, the timing when the secondary current decreases to zero can be found when the drain-source voltage is lowered to a certain level corresponding to the source DC voltage. Taking this into consideration, it is possible with this modification that the comparator 62 can determine the timing of the secondary current decreasing to zero based on either the variation ΔV or the drain-source voltage of transistor 23 by suitably setting a circuit constant including the reference voltage Vn1.

Figure 17:
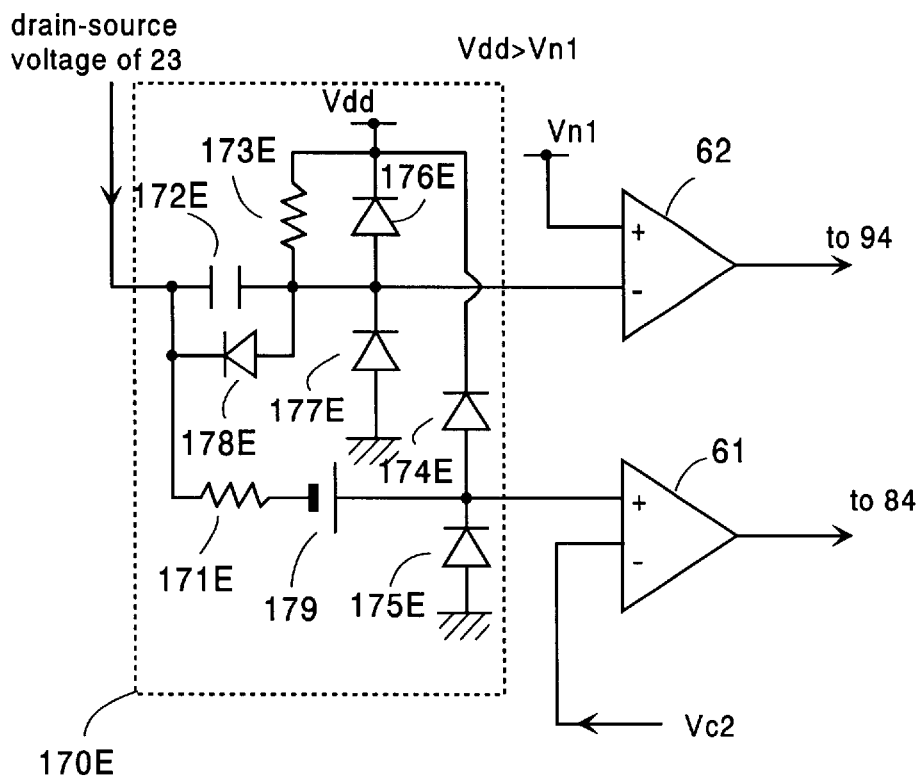

FIG. 17 shows a further modified switch voltage detector 170E which may be utilized instead of the detector 70 of the embodiment of FIG. 1 and is basically identical to the modification of FIG. 16 except that an offset voltage 179 is connected in series with resistor 171E. Like parts are designated by like reference numerals with a suffix letter of "E". With the addition of the offset voltage to the drain-source voltage, a reliable operation of the ballast is assured. Particularly upon seeing a condition where the output power is almost zero even if the output current flows, i.e., the output voltage is extremely low, the peak current command value generated at the error amplifier 55 is considerably low to apply a correspondingly low level voltage to the inverting input (−) of the first comparator 61. At this condition, the drain-source voltage plus the off-set voltage will certainly exceed the low level voltage of the peak current command value so that the comparator 61 can issue the high level output for minimizing the ON-period of transistor 23. With this result, the output of the converter is controlled by the varying OFF-period determined by the output of the second comparator 62. In this connection, it is noted that diodes 71 and 72 utilized in the detector 70 of the first embodiment provides the like offset voltage to the drain-source voltage of transistor for comparison at the first comparator 61.

Figure 18:
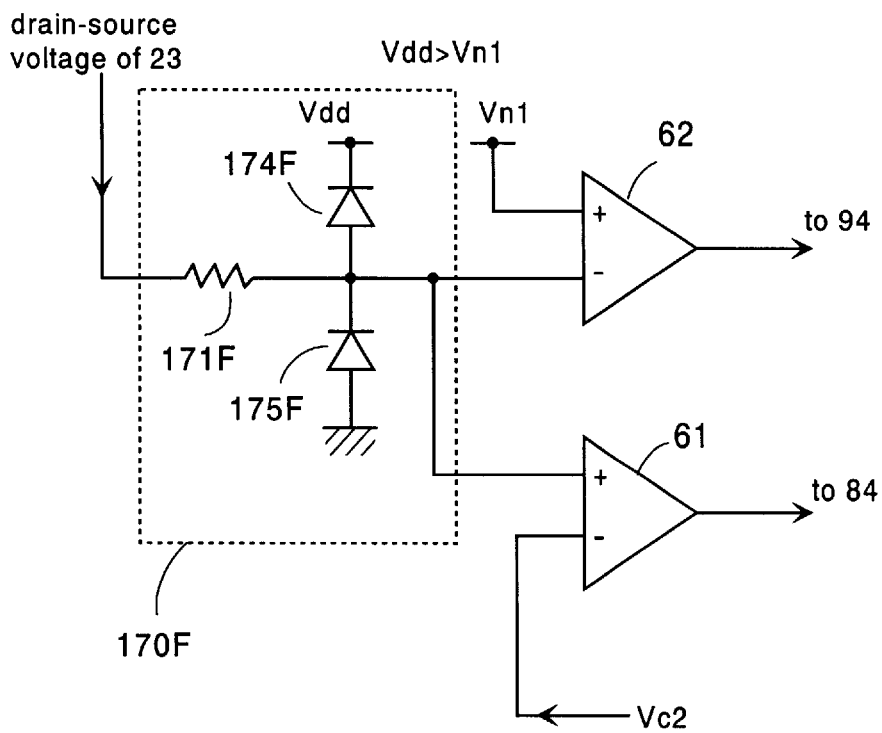

FIG. 18 shows a still further modified switch detector 170F which may be utilized instead of the detector 70 of the first embodiment. The switch detector 170F includes a resistor 171F through which the drain-source voltage of transistor 23 is fed to the non-inverting input (+) of the first comparator 61 as well as to the inverting input (−) of the second comparator 62. A diode clamp composed of diodes 174F and 175F is provided in circuit to prevent excessively high and low voltage from being fed to the comparators 61 and 62 for protection thereof. In this modification, the drain-source voltage indicative of the primary current is compared at the first comparator 61 with the peak current command value for changing the ON-period of transistor 23, and compared at the second comparator 62 with a reference voltage Vn1 to determine whether or not the secondary current decreases to zero for changing the OFF-period of transistor 23.

Figure 19:
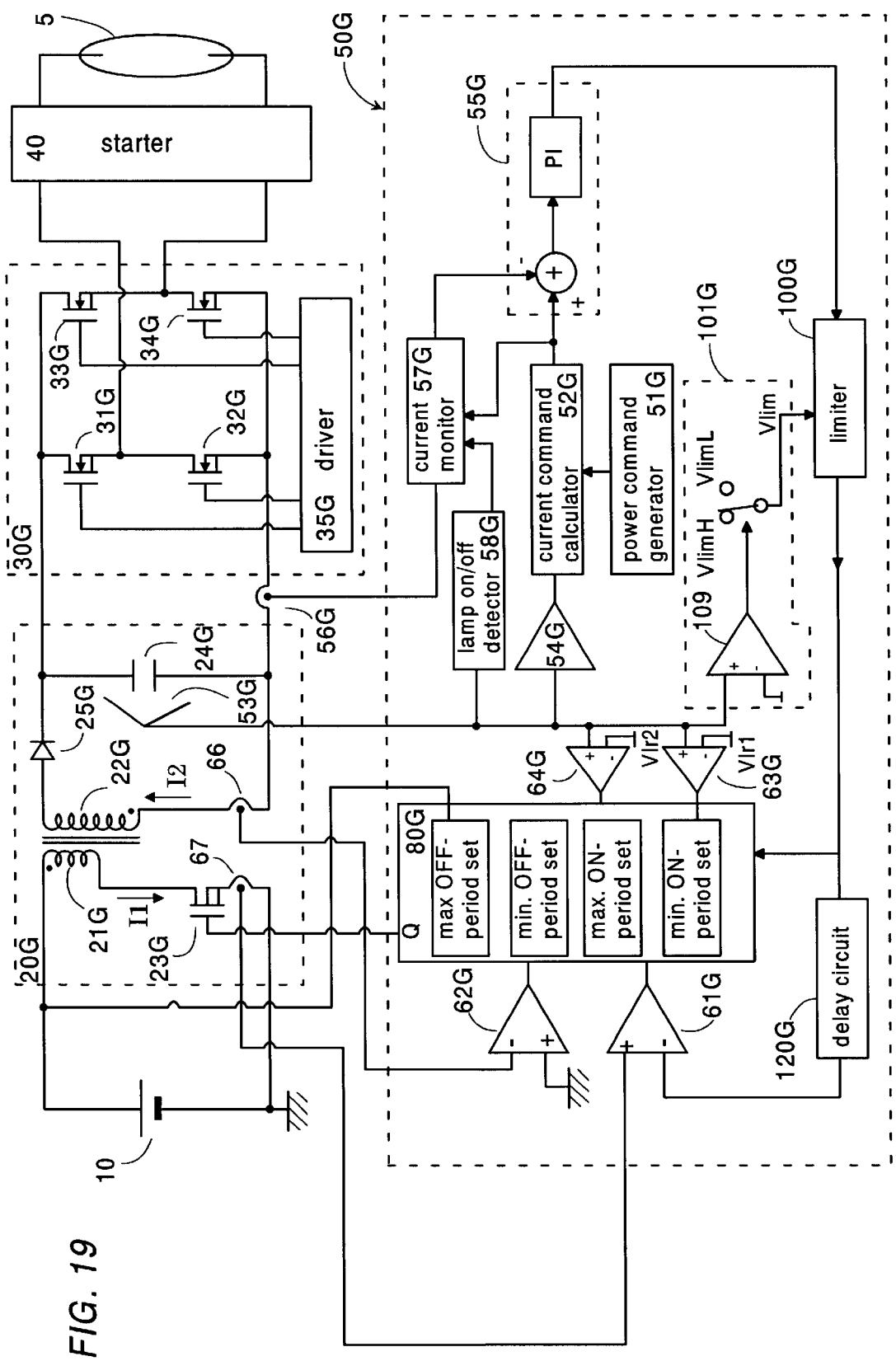
FIG. 19 is a schematic diagram of a ballast in accordance with a second embodiment of the present invention.

FIG. 19 shows a ballast in accordance with a second embodiment of the present invention which is basically identical to the first embodiment except that the second comparator 62G is directly connected to a current sensor 66 at one of the secondary winding 22G for receiving a corresponding voltage indicative of the secondary current flowing through the secondary winding. Like parts are designated by like reference numerals with a suffix letter of "G". The comparator 62G has its non-inverting input (+) grounded so that the comparator 62G provides the high level output when the secondary current decreases to zero, changing the OFF-period of transistor 23G as discussed with reference to FIG. 2 of the first embodiment. The first comparator 61G is connected to a current sensor 67 adjacent the transistor 23G to receive a corresponding voltage indicative of the primary current flowing through transistor 23G for comparison with the peak current command value in order to change the ON-period as discussed with reference to FIG. 2 of the first embodiment. Also in this embodiment, the limit value generator 1001 G includes a comparator 109 which compares the output voltage of the converter 20G with a reference level to switch the limit value between VlimH and VlimL such that the high limit value VlimH is fed to the limiter 101G when the output voltage is lower that the reference level and otherwise the low limit value VlimL is fed to the limiter 100G.

Although the above illustrated embodiment discloses the voltage converter of the fly-back type, the present invention should not be limited thereto and may include a voltage converter of another type such as a back-boost converter where an inductor is connected in series with the smoothing capacitor and the switching element across the DC source voltage, in which the primary current used in the specification and claims is defined to flow through the switching element when the switching element is turned on, while the secondary current is defined to that released from the inductor when the switching element is off.

What is claimed is:

1. A ballast for a discharge lamp comprising:
   a voltage converter providing a DC power from a DC source voltage, said voltage converter including a switching element and an energy storing element having an inductance, said switching element operating to repetitively switch the DC source voltage in order to store energy into said energy storing element;
   a power converter receiving said energy and converting it into an operating power for driving said discharge lamp;
   a controller which provides a command value and turns on and off said switching element for varying time periods in accordance with the command value in order to regulate the output of said voltage converter for generating a necessary power to said discharge lamp;
   said controller giving a variable OFF-period in which said switching element is turned off and a variable ON-period in which said switching element is turned on,
   said controller providing a minimum OFF-end limit and a forced maximum OFF-end limit for terminating said variable OFF-period,
   said controller providing a minimum ON-end limit and a forced maximum ON-end limit for terminating said variable ON-period,
   said minimum OFF-end limit being defined at a timing when a secondary current flowing from said inductance decreases to zero,
   said minimum ON-end limit being defined at a timing when a primary current flowing through said switching element or a primary voltage developed across said switching element reaches a level corresponding to said command value,
   said controller terminating the OFF-period at said minimum OFF-end limit or at said forced maximum OFF-end limit, whichever comes earlier
   said controller terminating the ON-period at said minimum ON-end limit or at said forced maximum ON-end limit, whichever comes earlier.

2. The ballast as set forth in claim 1, wherein said controller monitors an output condition of said voltage converter and provides said command value which varies with the output condition.

3. The ballast as set forth in claim 1, wherein said forced maximum OFF-end limit varies in accordance with the output condition of said voltage converter.

4. The ballast as set forth in claim 3, wherein said controller monitors an output power of said voltage converter as indicative of said output condition, and provides said command value based upon said output power, and said controller causing said forced maximum OFF-end limit to vary in accordance with said command value in a direction of shortening the OFF-period as the command value demands to flow an increased current through the switching element.

5. The ballast as set forth in claim 1, wherein said controller includes a voltage detector which detects said primary voltage across the switching element and compares said primary voltage with a reference so as to judge that the secondary current decreases to zero when said primary voltage decreases to said reference.

6. The ballast as set forth in claim 1, wherein said controller includes a voltage variation detector which detects a variation in the voltage across the switching element and compares said variation with a reference so as to judge that the secondary current decreases to zero when said variation reaches said reference.

7. The ballast as set forth in claim 1, wherein said controller includes a comparator which compares an output voltage of said voltage converter with an allowable maximum voltage and issues a limit signal when the output voltage exceeds said allowable maximum voltage, said controller, in response to said limit signal, prolonging the subsequent OFF-period until said output voltage goes below said allowable maximum voltage.

8. The ballast as set forth in claim 1, wherein said forced maximum ON-end limit varies in accordance with said DC source voltage so as to be earlier as said DC source voltage becomes greater.

9. The ballast as set forth in claim 1, wherein said command value has an upper limit which defines a maximum current allowed to flow through said switching element.

10. The ballast as set forth in claim 9, wherein said controller includes a delay circuit which delays an increase of said command value when said voltage converter starts operating.

11. The ballast as set forth in claim 9, wherein said controller includes a restrictor circuit which reduces said upper limit to a low level for a predetermined starting period from the start of operating the ballast and restores said upper limit to a high level after the elapse of said starting period.

12. The ballast as set forth in claim 9, wherein said controller includes an output voltage monitor which monitors an output voltage of said voltage converter so as to reduce said upper limit to a lower level as said output voltage becomes greater.

13. The ballast as set forth in claim 1, wherein said controller includes an output voltage monitor which monitors an output voltage of said voltage converter and provides a signal when said output voltage exceeds a predetermined voltage which is greater than an operating voltage for operating the lamp, said controller, in response to said signal, varying said minimum ON-end limit of said ON-period in a direction of elongating the ON-period than in the absence of said promote signal.

* * * * *